United States Patent Office 3,206,306
Patented Sept. 14, 1965

3,206,306
MATERIAL FOR ELECTROPHOTOGRAPHIC
PURPOSES
Wilhelm Neugebauer, Martha Tomanek, and Hans Behmenburg, all of Wiesbaden-Biebrich, Germany, assignors, by mesne assignments, to Azoplate Corporation, Murray Hill, N.J.
No Drawing. Filed Apr. 7, 1960, Ser. No. 20,517
Claims priority, application Germany, Apr. 9, 1959, K 37,437
20 Claims. (Cl. 96—1)

Electrophotographic material normally consists of a support on which there is a photoconductive substance, this coating being provided with an electrostatic charge in the absence of light. The material is then exposed to light behind a master, or an episcopic image is projected thereon, so that an electrostatic image is formed which corresponds to the master. This image is developed by being briefly contacted with a resin powder, whereupon a visible image is formed which is fixed by heating or by the action of solvents. In this way, an image of the master which is resistant to abrasion is obtained electrophotographically.

For the photoconductive coatings, inorganic substances such as selenium, sulphur or zinc oxide have been used and organic compounds such as anthracene and anthraquinone have also been employed for this purpose.

In accordance with the present invention, a material for electrophotographic purposes is provided in which the photoconductive coating comprises one or more organic compounds each having at least two aromatic rings and at least one amino group, the aromatic rings being fused with a heterocyclic ring.

The supports for the photoconductive coatings are primarily foils made of metal, e.g. aluminum, zinc, copper; cellulose products such as paper and cellulose hydrate; cellulose esters such as cellulose acetate and cellulose butyrate; especially such esters which are partially saponified and having a specific conductivity higher than $10^{-12}$ ohm$^{-1}$.cm.$^{-1}$, such as polyvinyl alcohol, polyamides and polyurethanes.

A support useful for the preparation of the material of the present invention should be electroconductive. This term means in the present case that the support should have an electroconductivity which is suitable for electrophotographic purposes. Such supports comprise very good conductors, e.g. metal, as well as materials which have a relatively low conductivity and are no conductors in the usual sense, such as paper. The term "electroconductive support" in the meaning of the present case should comprise supports which have a specific conductivity higher than $10^{-12}$ ohm$^{-1}$.cm.$^{-1}$, preferably higher than $10^{-10}$ ohm$^{-1}$.cm.$^{-1}$.

If paper is used as supporting material, it is preferably pretreated against the penetration of the coating solutions, e.g., it can be treated with a solution of methyl cellulose or polyvinyl alcohol in water or with a solution of an interpolymer of acrylic acid methyl ester and acrylonitrile in a mixture of acetone and methylethylketone, or with solutions of polyamides in aqueous alcohols or with aqueous dispersions of such substances.

Exemplary of the organic compounds used in the photoconductive coatings of the invention are 3-amino-carbazole, n-ethyl-3-amino-carbazole, 3-amino-5,6-benzocarbazole and 3,6-diamino-carbazole, which have the following formulae respectively:

FORMULA 1

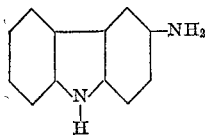

FORMULA 2

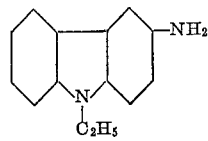

FORMULA 3

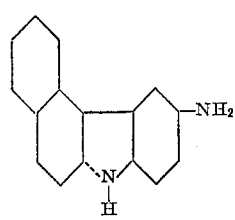

FORMULA 4

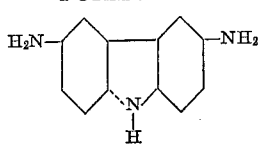

The preparation of the compounds is by the usual processes of organic chemistry, such as reduction of the corresponding nitro or nitroso compound or conversion of the corresponding halogen compounds into the amino compounds by means of ammonia or amino compounds or amines under conditions of heat and possibly increased pressure.

The compounds are very well suited for the production of photoconductive coatings and are generally colorless.

For the preparation of the electrophotographic material, the photoconductive amino compounds containing more than one aromatic nucleus are preferably dissolved in organic solvents such as benzene, acetone, methylene chloride or ethyleneglycol monomethylether or other organic solvents in which they are readily soluble, or in mixtures of such solvents. These solutions are coated upon the supporting material in the normal manner, e.g. by immersion processes, painting or roller application or by spraying. The material is then heated so that the solvent is removed.

A number of the compounds in question can be applied together to the supporting material or the compounds can be applied in association with other photoconductive substances.

Further, it is often advantageous for the compounds to be used in association with organic resins as photoconductive coatings. Resins primarily of interest for this purpose include natural resins such as balsam resins, colophony and shellac, synthetic resins such as phenol resins modified with colophony, and other resins in which colophony constitutes the major part, coumarone resins, indene resins and those included under the collective term "synthetic lacquer resins." According to the Saechtling-Zebrowski Plastics Handbook, 11th edition, 1955, page 212 et seq., these include the following; processed natural substances such as cellulose ethers; polymers such as vinyl polymers, e.g., polyvinyl chloride, polyvinylidene chloride, polyvinyl acetate, polyvinyl acetals, polyvinyl ethers, polyacrylic and polymethacrylic acid esters, as also polystyrene and isobutylene and chlorinated rubber; polycondensates, e.g., polyesters, such as phthalate resin, alkyd resin, maleic resinate, maleic acid/colophony mixed esters of higher alcohols, phenol-formaldehyde resins, in particular phenolformaldehyde resins modified with colophony, ureaformaldehyde condensates, melamine-formaldehyde resins, aldehyde resins, ketone resins, particularly so-called AW 2 resins, xylene-formaldehyde resins, polyamides, and polyadducts such as polyurethanes. Also, polyolefins such as various polyethylenes and polypropylenes and phthalic acid polyesters, such as terephthalic and isophthalic acid ethyleneglycol polyesters may be used.

If the photoconductive compounds are used in association with the resins described above, the proportion of resins to photoconductive substance can vary very greatly. Mixtures of from 2 parts of resin and one part of photoconductive substance to two parts of photoconductive substance to one part of resin are preferred. Mixtures of the two substances in equal parts by weight are particularly favorable.

The solutions of the compounds, with or without the resins, are applied to the supports in the usual manner, for example, by painting, roller application, immersion processes or by spraying, and then dried. An even, homogeneous, transparent and, in most cases, colorless photoconductive layer is thus formed.

The light-sensitivity of these photoconductive coatings is in the long wave ultra-violet region, at about 3600–4200 A. With high-pressure mercury vapor lamps, which transmit a large amount of ultra-violet rays, short exposure times can, however, be achieved.

The light sensitivity of the photoconductive layer in the visible part of the spectrum can be highly improved by the addition of sensitizers so that even with ordinary light sources short exposure times can be achieved. Even very small additions, e.g., less than 0.01 percent, have considerable effect. In general, however, the amount of "sensitizer" to be added to the photoconductive substance is from 0.01 to 5 percent, and preferably 0.1 to 3 percent. The addition of larger quantities is possible but in general is not accompanied by any considerable increase in sensitivity.

Suitable sensitizers are constituted in particular by dyestuffs, of which some examples are listed below. They are taken from Schultz' "Farbstofftabellen" (7th edition, 1931, 1st vol.).

Triarylmethane dyestuffs such as Brilliant Green (No. 760, p. 314), Victoria Blue B (No. 822, p. 347) Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G. Extra (No. 865, p. 366), Sulphorhodamine B (No. 863, p. 364) and Fast Acid Eosin G (No. 870, p. 368), as also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g. Cyanine (No. 921, p. 394) and chlorophyll.

For the production of copies using the electrocopying material, the photoconductive coating is charged positively or negatively, by means of, for example, a corona discharge with a charging apparatus maintained at 6000–7000 volts. The electrocopying material is then exposed to light in contact with a master or, alternatively, an episcopic or image diascopic image is projected thereon. An electrostatic image corresponding to the master is thus produced on the material. This invisible image is developed by contact with a developer powder consisting of carrier and toner. The carriers used may be, for example, tiny glass balls, iron powder or tiny plastic balls. The toner consists of a resin-carbon black mixture or a pigmented resin of a grain-size of 1 to 100µ. The developer may also consist of a resin or pigment suspended in a non-conductive liquid in which resins may be dissolved. The image that now becomes visible is then fixed, e.g. by heating with an infra-red radiator to 100–170° C., preferably 120–150° C. or by treatment with solvents such as trichloroethylene, carbon tetrachloride or ethyl alcohol, or steam. If a polarity of the electrical charge is used which is opposite to the polarity of the toner contained in the developer, images corresponding to the master, characterized by good contrast effect, are obtained. By changing the polarity of the corona discharge, it is also possible to obtain reversal images by using the same master and the same developer.

After being fixed, these electrophotographic images can be converted into printing plates, if the support, e.g. paper, metal or plastic foil, is wiped over with a solvent for the photoconductive layer, e.g. alcohol or acetic acid, then washed down with water and linked up in known manner with greasy ink. In this way, printing plates are obtained which can be set up in an offset machine and used for printing.

If transparent supporting material is used, the electrophotographic images can also be used as masters for the production of additional copies on any type of light-sensitive sheets. In this respect, the photoconductive compounds provided by the invention are superior to the substances used hitherto, such as selenium or zinc oxide, inasmuch as the latter give only cloudy layers. Furthermore, the photoconductive material of the present case has an improved photoconductivity which is superior to that of the known organic photoconductors, such as anthracene, benzidine and anthraquinone.

If translucent supports are used for photoconductive layers such as are provided by the invention, reflex images can be produced also. The electrophotographic material constituted in accordance with the invention has the advantage that it gives images rich in contrast and that it can be charged positively as well as negatively.

The invention will be further illustrated by reference to the following specific examples:

*Example 1*

1 part by weight of the compound corresponding to Formula 1 (prepared by the Ziersch method, "Berichte der Deutschen Chemischen Gesellschaft," 42 (1909), p. 3798) and 1 part by weight of a ketone resin (Kunstharz EM) in 30 parts by weight of ethyleneglycol monomethyl-ether are coated upon a paper the surface of which has been treated in known manner against the penetration of organic solvents, and dried. Direct images can be produced on this paper by electrophotographic process. After being charged by corona discharge of a negative polarity, the paper is exposed under a master to the light of a high-pressure mercury vapor lamp and then dusted over in known manner with a developer consisting of a mixture of carrier and toner. The carrier used can consist of tiny glass balls, iron powder, organic and inorganic substances. The toner consists of a resin-carbon black mixture or a pigmented resin of a grain size of 1–100µ. An image corresponding to the master in formed which is fixed by heating and is characterized by good contrast effect. If transparent supports are used for the preparation of xerographic images, these can be used in known manner as master for further copying on any type of light-sensitive sheets. If the photoconductive layer is charged with a corona discharge of a positive polarity from the same master by using the same developer there are obtained reversal prints, i.e. negatives of the master.

*Example 2*

0.5 part by weight of the compound corresponding to Formula 2 (DRP 266,942), 1.5 parts by weight of the compound corresponding to Formula 3 (Kehrmann and Oulevay, Berichte der Deutschen Chemischen Gesellschaft, 46 (1913), p. 3723) and 2 parts by weight of coumarone resin (Cumaronharz 701/70) in 30 parts by weight of methylene chloride are coated upon an aluminum foil. After evaporation of the solvent, the coating adheres firmly to the surface. In the manner described in Example 1 there could be obtained prints of the aluminum foil. It is also possible to obtain images on paper by a transfer process. In this case a sheet of paper is laid onto the unfixed powder image and charged with a corona discharge having the same polarity as the original charge of the now developed electrostatic image, so that the powder image is attracted by the paper and thereon fixed by heating. If a transfer process is carried out, the master used is laid with the image side on the photoconductive coating to obtain direct readable prints on the paper after the transfer process.

*Example 3*

0.5 part by weight of the compound corresponding to Formula 4 (Fischer and Hepp. "Berichte der Deutschen Chemischen Gesellschaft," 23 (1890), p. 2788), 0.5 part by weight of 1-amino-anthracene (von Braun and Bayer, "Annalen der Chemie," 472 (1929), p. 113), 0.03 part by weight of Methylene Blue (Schultz' "Farbstofftabellen," 7th edition (1931), No. 1038) and 1 part by weight of resin-modified maelic acid resin ("Beckacite" K 105), are dissolved in a mixture of 20 parts by weight of methylene chloride and 20 parts by weight of benzene. The solution is applied to a paper foil, the surface of which has been pretreated against the penetration of organic solvents. The coating is dried; further procedure is as in Example 1. An image corresponding to the master is obtained.

*Example 4*

The procedure described in Example 1 is followed, but for coating the paper a solution is used consisting of 0.5 part by weight of the compound corresponding to Formula 1, 0.5 part by weight of 13-amino-benzanthrone and 0.01 part by weight of Fast Acid Eosin G (Schultz' "Farbstofftabellen," 7th edition (1931), No. 870) in 30 parts by weight of ethyleneglycol monomethylether. Images rich in contrast are obtained. The images can also be produced by episcopic projection from double-sided printed pages. Continuous tones and full tones are reproduced well.

It will be obvious to those skilled in the art that many modifications may be made within the scope of present invention without departing from the spirit thereof, and the invention includes all such modifications.

What is claimed is:

1. An electrophotographic material comprising a conductive support layer and a uniform, continuous photoconductive insulating layer, the latter comprising a compound having the formula

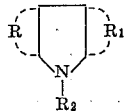

in which R and R₁ are fused ring ortho-arylene groups, at least one of the rings having a primary amine group attached thereto, and R₂ is selected from the group consisting of hydrogen and lower alkyl.

2. An electrophotographic material according to claim 1 in which the photoconductive layer contains a dyestuff sensitizer.

3. An electrophotographic material according to claim 1 in which the photoconductive layer contains a resin.

4. An electrophotographic material comprising a conductive support layer and a uniform, continuous photoconductive insulating layer, the latter comprising a compound having the formula

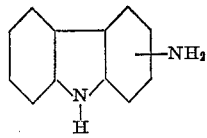

5. An electrophotographic material comprising a conductive support layer and a uniform, continuous photoconductive insulating layer, the latter comprising a compound having the formula

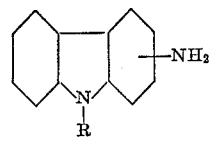

in which R is a lower alkyl radical.

6. An electrophotographic material comprising a conductive support layer and a uniform, continuous photoconductive insulating layer, the latter comprising a compound having the formula

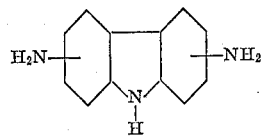

7. An electrophotographic material comprising a conductive support layer and a uniform, continuous, photoconductive insulating layer, the latter comprising a compound having the formula

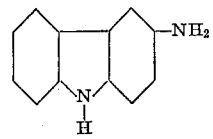

8. An electrophotographic material comprising a conductive support layer and a uniform, continuous, photoconductive insulating layer, the latter comprising a compound having the formula

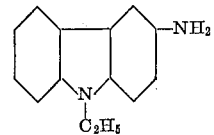

9. An electrophotographic material comprising a conductive support layer and a uniform, continuous, photoconductive insulating layer, the latter comprising a compound having the formula

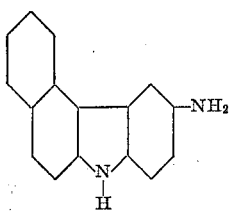

10. An electrophotographic material comprising a conductive support layer and a uniform, continuous, photoconductive insulating layer, the latter comprising a compound having the formula

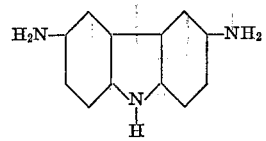

11. A photographic reproduction process which comprises exposing an electrostatically charged supported photoconductive insulating layer to light under a master and developing the resulting image with an electroscopic material, the photoconductive layer comprising a compound having the formula

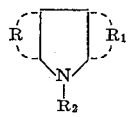

in which R and R₁ are fused ring ortho-arylene groups, at least one of the rings having a primary amine group attached thereto, and R₂ is selected from the group consisting of hydrogen and lower alkyl.

12. A photographic reproduction process according to claim 11 in which the photoconductive layer contains a dyestuff sensitizer.

13. A photographic reproduction process according to claim 11 in which the photoconductive layer contains a resin.

14. A photographic reproduction process which comprises exposing an electrostatically charged supported photoconductive insulating layer to light under a master and developing the resulting image with an electroscopic material, the photoconductive layer comprising a compound having the formula

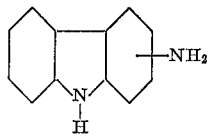

15. A photographic reproduction process which comprises exposing an electrostatically charged supported photoconductive insulating layer to light under a master and developing the resulting image with an electroscopic material, the photoconductive layer comprising a compound having the formula

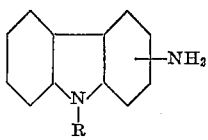

in which R is a lower alkyl radical.

16. A photographic reproduction process which comprises exposing an electrostatically charged supported photoconductive insulating layer to light under a master and developing the resulting image with an electroscopic material, the photoconductive layer comprising a compound having the formula

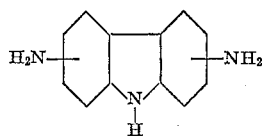

17. A photographic reproduction process which comprises exposing an electrostatically charged supported photoconductive insulating layer to light under a master and developing the resulting image with an electroscopic material, the photoconductive layer comprising a compound having the formula

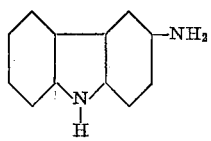

18. A photographic reproduction process which comprises exposing an electrostatically charged supported photoconductive insulating layer to light under a master and developing the resulting image with an electroscopic material, the photoconductive layer comprising a compound having the formula

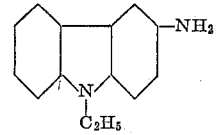

19. A photographic reproduction process which comprises exposing an electrostatically charged supported photoconductive insulating layer to light under a master and developing the resulting image with an electroscopic material, the photoconductive layer comprising a compound having the formula

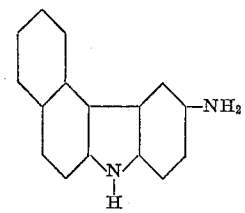

20. A photographic reproduction process which comprises exposing an electrostatically charged supported photoconductive insulating layer to light under a master and developing the resulting image with an electroscopic material, the photoconductive layer comprising a compound having the formula

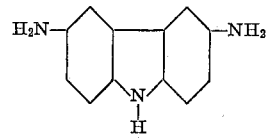

References Cited by the Examiner

UNITED STATES PATENTS

| | | | |
|---|---|---|---|
| 2,094,952 | 10/37 | Lehmann et al. | 260—315 X |
| 2,297,691 | 10/42 | Carlson | 96—1 |
| 2,334,348 | 11/43 | Miglarese | 167—90 |
| 3,037,861 | 6/62 | Hoegel et al. | |
| 3,041,165 | 6/62 | Sus et al. | |
| 3,047,390 | 7/62 | Koerber et al. | 96—82 |

FOREIGN PATENTS

| | | |
|---|---|---|
| 201,301 | 3/56 | Australia. |
| 562,336 | 5/58 | Belgium. |
| 1,177,936 | 12/58 | France. |
| 1,188,600 | 3/59 | France. |

OTHER REFERENCES

Vartanian: Acta Physicochimica, URSS, vol. 22, No. 2, pp. 201–24 (1947).

Inokuchi: Bull. Chem. Soc. Japan, 27, pp. 22–27 (1954).

Winslow et al.: JACS, vol. 77, pp. 4751–6, Sept. 20, 1955.

Lyons et al.: J. Chem. Soc., 1957, pp. 3648–68.

Photo. Korrespondez 94 (1958), pp. 3–11 and 19–26.

NORMAN G. TORCHIN, *Primary Examiner.*

PHILIP E. MANGAN, HAROLD N. BURSTEIN,
*Examiners.*